(12) United States Patent
Watanabe et al.

(10) Patent No.: US 7,197,650 B2
(45) Date of Patent: Mar. 27, 2007

(54) CHARGING AND MONITORING APPARATUS AND METHOD OF CHARGING A BATTERY AND MONITORING THE POWER LEVEL THROUGH POWER SUPPLY LINE

(75) Inventors: Mikio Watanabe, Asaka (JP); Hiroyuki Kurase, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 64 days.

(21) Appl. No.: 09/883,938

(22) Filed: Jun. 20, 2001

(65) Prior Publication Data

US 2001/0032275 A1    Oct. 18, 2001

Related U.S. Application Data

(62) Division of application No. 09/589,278, filed on Jun. 8, 2000, now Pat. No. 6,298,395, which is a division of application No. 09/014,383, filed on Jan. 27, 1998, now Pat. No. 6,138,178.

(30) Foreign Application Priority Data

Jan. 29, 1997 (JP) ................................. 9-028290
Mar. 17, 1997 (JP) ................................. 9-082421

(51) Int. Cl.
*G06F 1/26* (2006.01)

(52) U.S. Cl. .............................. 713/300; 710/1; 710/8; 710/15; 710/16; 713/330; 713/340; 320/107; 320/108; 320/136; 320/137; 320/104; 307/43; 307/126; 307/130; 307/131; 455/127.2

(58) Field of Classification Search .................... 710/1, 710/15, 8, 16; 320/107, 108, 136, 137, 104; 307/43, 126, 130, 131; 713/330, 300, 340; 455/127.2
See application file for complete search history.

(56) References Cited

U.S. PATENT DOCUMENTS

| | | | |
|---|---|---|---|
| 4,788,637 A | 11/1988 | Tamaru | 709/221 |
| 5,228,118 A | 7/1993 | Sasaki | 358/1.13 |
| 5,371,453 A * | 12/1994 | Fernandez | 320/136 |
| 5,386,567 A | 1/1995 | Lien et al. | 713/100 |
| 5,390,301 A | 2/1995 | Scherf | 709/321 |
| 5,517,646 A | 5/1996 | Piccirillo et al. | 713/1 |
| 5,580,177 A | 12/1996 | Gase et al. | 400/61 |

(Continued)

FOREIGN PATENT DOCUMENTS

JP    7219865    8/1995

(Continued)

*Primary Examiner*—Tammara Peyton
(74) *Attorney, Agent, or Firm*—Birch, Stewart, Kolasch & Birch, LLP

(57) ABSTRACT

A battery is charged utilizing electric power provided by a power supply line included in a cable that is in accordance with IEEE 1394. A charging apparatus and a personal computer are connected together by the cable. A power source unit in the personal computer converts AC voltage to direct voltage and supplies the DC voltage to the power supply line. The voltage is applied to a charging circuit via the power supply line, thereby charging the battery. A signal line included in the cable is used when the charging apparatus and personal computer send and receive data to and from each other.

11 Claims, 9 Drawing Sheets

U.S. PATENT DOCUMENTS

| | | | |
|---|---|---|---|
| 5,589,719 A * | 12/1996 | Fiset | 307/131 |
| 5,613,123 A | 3/1997 | Tsang et al. | 713/1 |
| 5,617,008 A | 4/1997 | Eastmond et al. | 320/133 |
| 5,623,696 A | 4/1997 | Johnson et al. | 709/326 |
| 5,664,015 A * | 9/1997 | Ford et al. | 379/433.01 |
| 5,752,040 A | 5/1998 | Kaneko et al. | 717/170 |
| 5,764,026 A * | 6/1998 | Issa | 320/104 |
| 5,802,365 A | 9/1998 | Kathail et al. | 709/321 |
| 5,812,796 A | 9/1998 | Broedner et al. | 710/302 |
| 5,815,205 A * | 9/1998 | Hashimoto et al. | 348/373 |
| 5,859,628 A * | 1/1999 | Ross et al. | 345/173 |
| 5,867,730 A | 2/1999 | Leyda | 710/10 |
| 5,898,908 A * | 4/1999 | Griffin et al. | 455/127.2 |
| 5,903,700 A * | 5/1999 | Fukushima | 386/46 |
| 6,100,806 A | 8/2000 | Gaukel | 340/573.4 |

FOREIGN PATENT DOCUMENTS

| | | |
|---|---|---|
| JP | 407281986 | 10/1995 |
| JP | 408101803 | 4/1996 |
| JP | 8-161250 A | 6/1996 |
| JP | 8-161252 A | 6/1996 |

* cited by examiner

Fig. 1
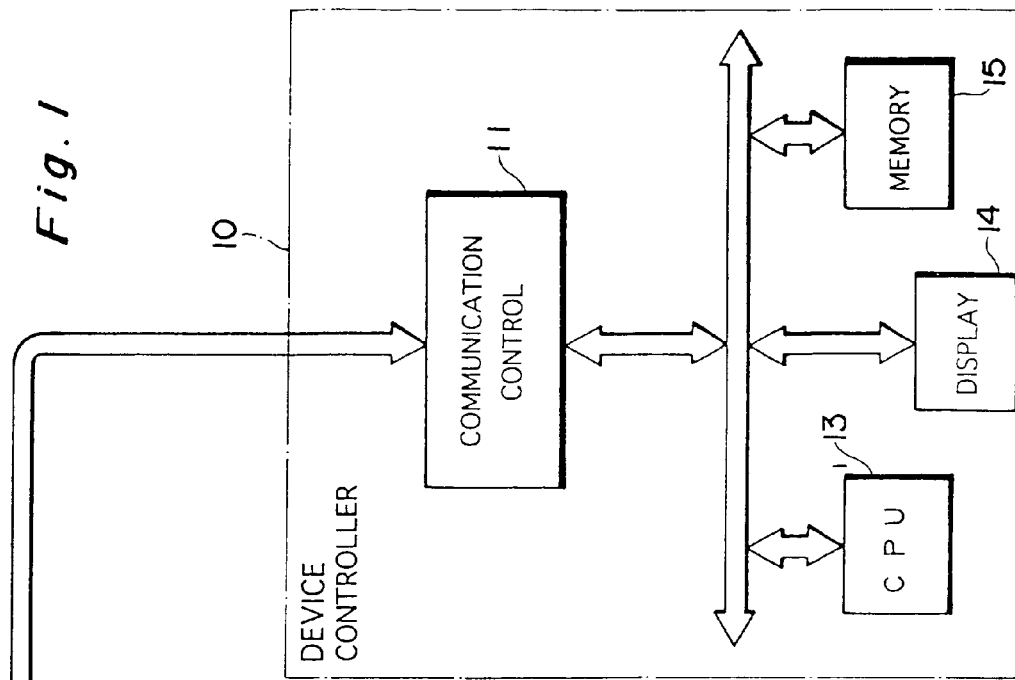
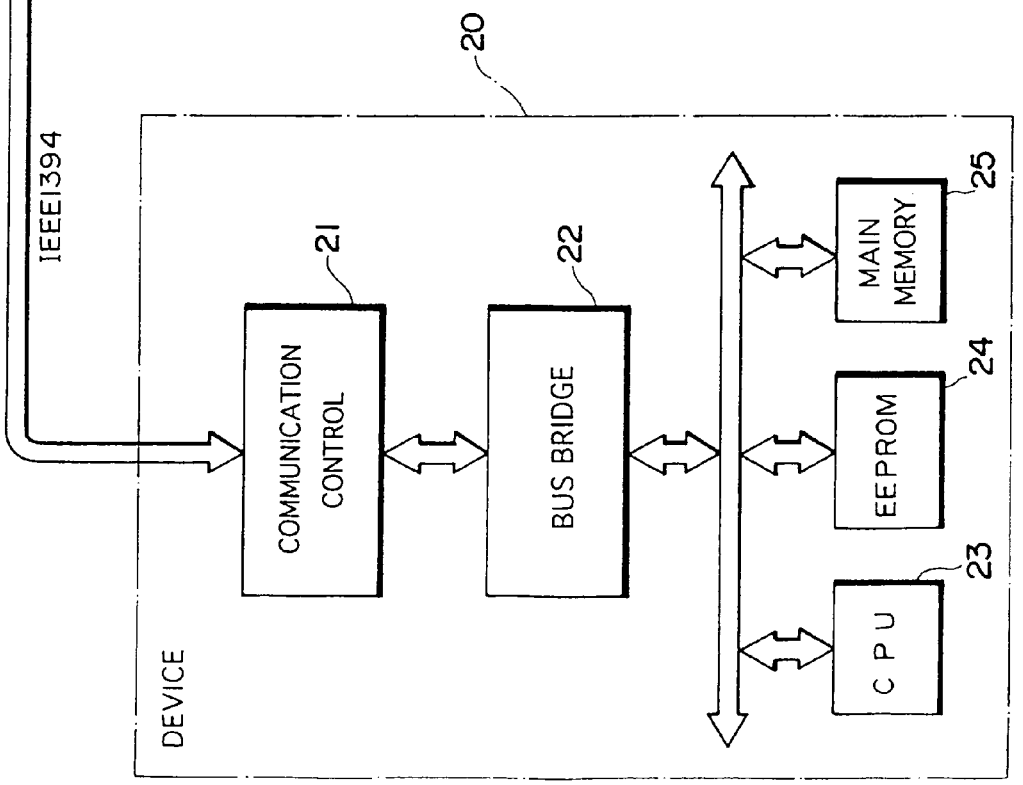

Fig.2

| | 0   7 | 8   15 | 16   23 | 24   31 | Bit |
|---|---|---|---|---|---|
| BUS INFORMATION BLOCK | SIZE OF BUS INFORMATION BLOCK | CRC DATA LENGTH | CRC VALUE OF EEPROM | | |
| | NAME OF BUS | | | | |
| | ISOCH-RONOUS DATA OK? | RE-SERVE | CYCLE CLOCK SPEED | PAYROAD SYZE | RESERVE |
| | DEVICE MAKER ID | | | INTERFACE HARDWARE ID | |
| ROOT DIRECTORY | INTERFACE HARDWARE ID | | | | |
| | SIZE OF ROOT DIRECTORY | | CRC | | |
| | DATA INDEX | INTERFACE MODULE MAKER ID | | | |
| | DATA INDEX | RESERVE | CAPABILITY FRAG | | |
| | DATA INDEX | ADDRESS OF HARDWARE-UNIQUE ID | | | |
| | DATA INDEX | ADDRESS OF UNIT DIRECTORY | | | |

Fig. 3

| 0 7 | 8 15 | 16 23 | 24 31 |
|---|---|---|---|
| SIZE OF UNIT DIRECTORY | | CRC | |
| DATA INDEX | DEVICE MAKER ID | | |
| DATA INDEX | SOFTWARE VERSION OF DEVICE CPU | | |
| DATA INDEX | ADDRESS OF UNIT-SPECIFIC INFORMATION DIRECTORY | | |

UNIT DIRECTORY

Fig. 4

| 0 7 | 8 15 | 16 23 | 24 31 |
|---|---|---|---|
| SIZE OF UNIT-SPECIFIC INFORMATION DIRECTORY | | CRC | |
| DATA INDEX | COMMAND ADDRESS | | |
| DATA INDEX | DEVICE MAKER NAME | | |
| DATA INDEX | DEVICE MODEL NAME | | |
| DATA INDEX | ADDRESS OF DRIVER-SOFTWARE INFORMATION DIRECTORY | | |

UNIT-SPECIFIC INFORMATION DIRECTORY

Fig.5

DRIVER-SOFTWARE INFORMATION DIRECTORY

| 0        7 | 8        15 | 16        23 | 24        31 |
|---|---|---|---|
| DATA LENGTH || CRC ||
| CORRESPONDING OS NAME OF DRIVER SOFTWARE (A) ||||
| MAJOR VERSION NO. || MINOR VERSION NO. ||
| STORAGE ADDRESS OF DRIVER SOFTWARE (A) ||||
| CORRESPONDING OS NAME OF DRIVER SOFTWARE (B) ||||
| MAJOR VERSION NO. || MINOR VERSION NO. ||
| STORAGE ADDRESS OF DRIVER SOFTWARE (B) ||||
| CORRESPONDING OS NAME OF DRIVER SOFTWARE (C) ||||
| MAJOR VERSION NO. || MINOR VERSION NO. ||
| STORAGE ADDRESS OF DRIVER SOFTWARE(C) ||||
| CORRESPONDING OS NAME OF DRIVER SOFTWARE (D) ||||
| MAJOR VERSION NO. || MINOR VERSION NO. ||
| STORAGE ADDRESS OF DRIVER SOFTWARE(D) ||||

DRIVER SOFTWARE ARCHIVE AREA

Fig. 9

| 10 | phy ID | O | L | gap cnt | sp | del | C | pwr | p0 | p1 | p2 | i | m |

CHARGING AND MONITORING APPARATUS AND METHOD OF CHARGING A BATTERY AND MONITORING THE POWER LEVEL THROUGH POWER SUPPLY LINE

This application is a divisional of application Ser. No. 09/589,278, filed on Jun. 8, 2000 now U.S. Pat. No. 6,298,395, which is a divisional of application Ser. No. 09/014,383, filed on Jan. 27, 1998 now U.S. Pat. No. 6,138,178, the entire contents of which are hereby incorporated by reference and for which priority is claimed under 35 U.S.C. § 120; and this application claims priority of Application No. 9-28290 and 9-82421 filed in JAPAN on Jan. 27, 1997 and Mar. 17, 1997 under 35 U.S.C. § 119.

BACKGROUND OF THE INVENTION

1. Field of the Invention

This invention relates to a data communication system and method through which a controller and a controlled device controlled by the controller perform data communication via a communication channel, and to the controller and controlled device that construct this data communication system. The invention relates further to a digital video camera and printer. The invention relates further to a method of controlling the storage of driver software and a method of reading out the driver software.

This invention relates further to a battery charging apparatus capable of being connected to a communication apparatus, which is capable of performing data communication via a communication channel, using this communication channel to make the connection. The invention relates further to a method of charging a battery.

2. Description of the Related Art

In a data communication system through which a controller (a personal computer) and a controlled device (a printer or digital video camera, etc.) perform data communication via a communication channel, it is necessary to install driver software in the controller in order to control the controlled device using the controller. In the prior art, the user loads a floppy disk or CD-ROM, on which driver software suited to the controlled device has been stored, into a floppy disk drive or CD-ROM drive of the controller. The driver software is then installed in the controller by being read out of the floppy disk or CD-ROM. However, performing installation by loading the floppy disk or CD-ROM into the floppy disk drive or CD-ROM drive is a troublesome operation for the user. In addition, there are occasions where the user accidentally installs driver software not suited to the controlled device.

On the other hand, in order to send and receive image data, use is made of parallel communication by relying upon a Centronics interface or SCSI (Small Computer System Interface), etc., and serial communication using an RS232C, RS422 or USB (Universal Serial Bus). With serial communication, only the sending and receiving of image data is performed and consideration has never been given to charging a battery by utilizing an image-data communication channel. If a battery is to be charged, a charging device must be connected via a separate power supply cable.

SUMMARY OF THE INVENTION

Accordingly, a first object of the present invention is to so arrange it that installation of driver software (a program for controlling an input/output unit or for performing a data transfer with an input/output unit) can be performed in comparatively simple fashion.

A second object of the present invention is to provide a battery charging apparatus capable of being connected to a communication apparatus, which is capable of performing data communication via a communication channel, using this communication channel to make the connection, as well as a battery charging method.

A first invention is to provide a data communication method through which a controller and a controlled device controlled by the controller perform data (inclusive of image data and audio data) communication via a communication channel.

In accordance with this data communication method, driver software of a plurality of types is stored in a storage area of the controlled device (e.g., a digital video camera or a printer).

The controller judges whether driver software suited to the controller has been stored in a predetermined first storage area of the controlled device. In response to a judgement by the controller to the effect that driver software suited to the controller has been stored in the controlled device, the driver software suited to the controller is read out of the first storage area, data representing the driver software read out is transmitted from the controlled device to the controller, and the transmitted data representing the driver software is stored in a second storage area of the controller.

A first aspect of the present invention is to provide a data communication system suitable for implementing the data communication method described above.

The data communication system according to the present invention is for communication of data between a controller and a controlled device via a communication channel.

The controlled device is provided with a first memory capable of storing driver software of a plurality of types.

The controller comprises a second memory for storing driver software, judgement means (a judgement device) for judging whether driver software suited to the controlled device has been stored in a predetermined first storage area of the first memory, readout means (a readout device), responsive to a judgement by the controller to the effect that driver software suited to the controller has been stored in the controlled device, for reading the driver software suited to the controlled device out of the first storage area, transmission control means (a transmission control device) for transmitting data, which represents the driver software read out by the readout control means, from the controlled device to the controller, and storage control means (a storage control device) for receiving the data representing the driver software transmitted by the transmission control means, and storing this data in a second storage area of the second memory.

The controller or controlled device constructing the data communication system described above may each be constructed as a stand-alone device.

In accordance with the first aspect of present invention, driver software of a plurality of types is stored in the controlled device described above. It is judged whether driver software suited to the controller which performs data communication with the controlled device has been stored among the plural types of driver software. If driver software suited to the controller has been stored, this driver software is read out of the controlled device and transmitted to the controller. The transmitted driver software is stored in the controller to complete installation.

In accordance with the first aspect of present invention, the labor involved in installing driver software, which is for performing data communication with a controlled device, in the controller is eliminated. Installation of the driver software can be executed without a troublesome operation being required of the user. In addition, driver software not suited to the controlled device can be prevented from being installed in the controller.

An arrangement may be adopted in which it is judged beforehand whether driver software suited to the controller has not been stored in the controller. In response to a judgement to the effect that the driver software has not been stored, it is judged whether driver software suited to the controller has been stored in the first storage area of the controlled device.

If, upon judging whether installation of driver software is required or not, it is found that installation is required, then installation is carried out. This makes it possible to prevent the re-installation of driver software that has already been installed.

It is preferred that in response to a judgement to the effect that driver software suited to the controller has not been stored in the first storage area of the controlled device, information relating to the result of the judgement is communicated to the user.

As a result, the user can be notified of the fact that driver software cannot be transmitted from the controlled device to the controller, as a result of which processing for installing the driver software cannot be executed. In this case, the user would load a floppy disk or the like, which stores the driver software suited to the controller, into the controller to perform installation of the driver software.

The above-mentioned communication line may be a cable in accordance with the IEEE (Institute for Electrical and Electronic Engineers) 1394 standards, and data representing the driver software may be transmitted in accordance with IEEE 1394. As a result, the data representing driver software can be sent and received at a comparatively high speed. Installation of the driver software is speeded up as a result.

It is preferred that the driver software stored in the controlled device be rewritable. This would make it possible to update the driver software.

It is preferred that the address of driver software that has been stored in the first storage area and information (the operating system used by the controller, etc.) relating to the controller capable of performing control using this driver software be stored so as to be capable of being read out.

By thus reading out the above-mentioned address as well as the information relating to the controller, the driver software can be read out again in comparatively simple fashion.

As many apparently widely different embodiments of the present invention can be made without departing from the spirit and scope thereof, it is to be understood that the invention is not limited to the specific embodiments thereof except as defined in the appended claims.

According to a second aspect of the present invention, there is provided a charging apparatus capable of being connected to a communication apparatus, which is capable of performing data communication via a communication channel, using this communication channel to make the connection, wherein the communication channel includes a communication line for data communication and a power supply line for supplying electric power, the apparatus having a charging circuit for charging a battery by being supplied with electric power through the power supply line.

According to the second aspect of the invention, there is also provided a method suited to the charging apparatus defined above.

Specifically, a method of charging a battery according to the present invention comprises connecting a charging apparatus, which includes a charging circuit, to a communication apparatus capable of performing data communication via a communication channel that includes a communication line for data communication and a power supply line for supplying electric power, the connection being made using the communication channel, and charging a battery by supplying electric power to the charging circuit through the power supply line.

In accordance with the second aspect of the invention, the charging apparatus can be connected to a communication apparatus, which is capable of performing data communication via a communication channel, using the communication channel. The communication channel includes a communication line for data communication and a power supply line for supplying electric power. Supplying the charging circuit with electric power through the communication line makes it possible to charge a battery. A power supply cable need not be connected separately of the communication channel.

Preferably, it is judged, based upon the power supplying capability of the communication apparatus, whether charging by the charging circuit is possible, and charging the battery by the charging circuit in response to a judgement to the effect that charging is possible.

Preferably, it is judged, based upon the level of electric power supplied from the power supply line, whether a decline in supplied power will occur in the power supply line. An adjustment is performed to reduce amount of charging by the charging circuit in response to a judgment to the effect that a decline in the supplied power will occur.

When the power supplying capability is low, it is possible to prevent data communication from being interrupted by a decline in supplied power caused by charging being carried out by the charging circuit.

According to a third aspect of the present invention, there is provided a charging apparatus capable of being connected to a communication apparatus, which is capable of performing data communication via a communication channel, using this communication channel to make the connection, wherein the communication channel includes a communication line for data communication and a power supply line for supplying electric power, the apparatus having a charging circuit for applying electric power, with which it is supplied through the power supply line, to a connector of a data processing unit driven by an installed battery, the data processing unit being formed to have the connector in order to input electric power for charging the battery.

According to the third aspect of the invention, there is also provided a method suited to the charging apparatus defined above.

Specifically, there is provided a method of charging a battery using a charging apparatus capable of being connected to a communication apparatus, which is capable of performing data communication via a communication channel, using this communication channel to make the connection, wherein the communication channel includes a communication line for data communication and a power supply line for supplying electric power, the method including applying electric power, which is supplied through the power supply line, to a connector of a data processing unit driven by an installed battery, the data processing unit being formed to have the connector in order to input electric power for charging the battery, the battery being charged by the electric power applied.

In accordance with the second aspect of the invention, a battery can be charged while still installed in a data processing unit driven by the installed battery.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the electrical configuration of a communication system according to a first embodiment of the present invention;

FIG. 2 illustrates the content of an EEPROM included in a device, namely the content of a bus information block and root directory;

FIG. 3 illustrates the content of an EEPROM included in a device, namely the content of a unit directory;

FIG. 4 illustrates the content of an EEPROM included in a device, namely the content of a unit-specific information directory;

FIG. 5 illustrates the content of an EEPROM included in a device, namely the content of a driver-software information directory;

FIG. 9 illustrates the format of a self-identification packet; and

Figure 6:
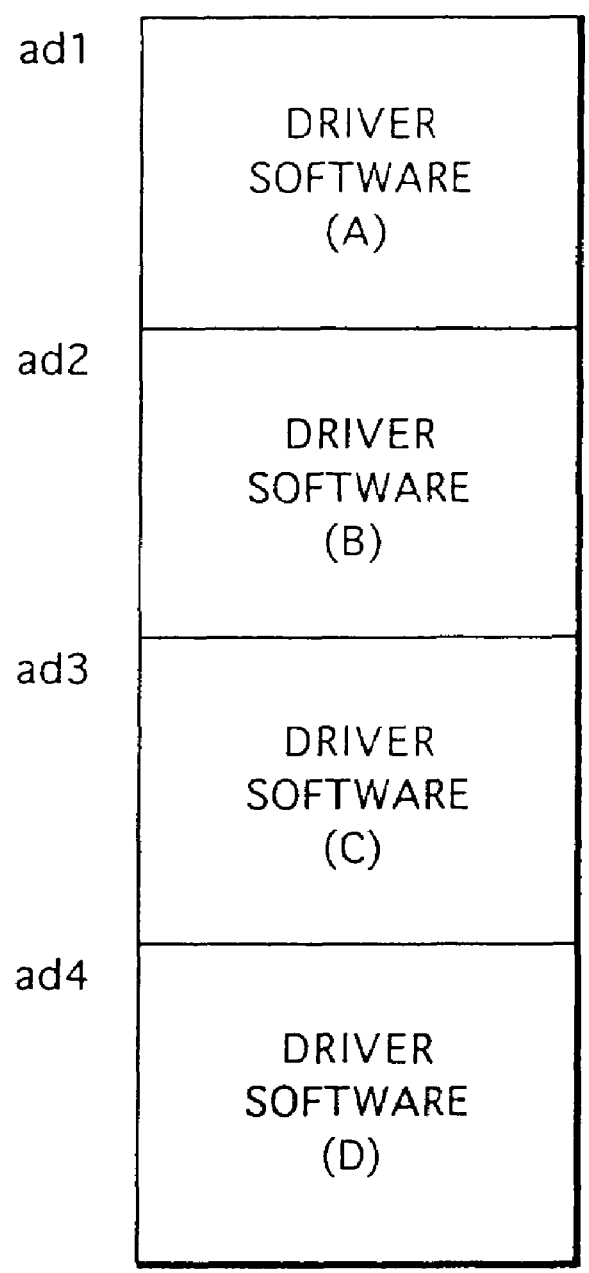
FIG. 6 illustrates the content of an EEPROM included in a device, namely the content of a driver-software archive area.

DESCRIPTION OF THE PREFERRED EMBODIMENT (1) First Embodiment

A preferred embodiment of the present invention will now be described with reference to the drawings.

FIG. 1 is a block diagram illustrating the electrical configuration of a communication system according to a first embodiment of the present invention.

In this communication system, a device 20 (a printer or digital video camera, etc.) and a device controller 10 for controlling the device 20 are connected by a cable in accordance with IEEE 1394.

The device controller 10 has its overall operation supervised by a CPU 13. The device controller 10 includes a communication control circuit 11 for performing a data transfer in accordance with IEEE 1394, a display unit 14 whose display is controlled by the CPU 13, and a memory 15 for storing an operation program and other necessary data.

The device 20 has its overall operation supervised by a CPU 23.

The device 20 includes a communication control circuit 21 in such a manner that data transfer in accordance with IEEE 1394 is possible. The communication control circuit 21 is connected to the CPU 23 via a bus bridge 22. The device 20 further includes an EEPROM 24 storing driver software for controlling the device 20 by the device controller 10, as well as other data (the details of which will be described later), and a main memory 25 for temporarily storing data (image data, audio data, etc.) transmitted from the device controller 10.

FIGS. 2 through 6 illustrate content stored in the EEPROM 24 of the device 20.

FIG. 2 illustrates the content of a bus information block and root directory, FIG. 3 illustrates the content of a unit directory, FIG. 4 illustrates the content of a user-specific information directory, FIG. 5 illustrates the content of a driver-software information directory and FIG. 6 illustrates the content of a driver-software archive area.

As shown in FIG. 2, a bus information block stores a flag indicating the size of the bus information block, data indicating CRC (cyclic redundancy check) data length, a CRC value of the EEPROM 24, bus name (since the device 20 and device controller 10 are connected by a cable in accordance with IEEE 1394 in this embodiment, this fact is stored here), data representing whether communication of isochronous data is allowed or not, a reserve area, speed of the cycle clock of a cycle master (here the device controller 10 is the cycle master), payload size of isochronous data, printer maker ID and interface hardware ID.

The root directory stores a flag indicating the size of the root directory, a CRC, an interface module maker ID and its data index (the data index is an item of data which represents what the following item of data is), a flag indicating the capability of a node (here the device 20), the address of a node-unique ID (which includes the maker ID and serial number of the node) and the address of the unit directory.

As shown in FIG. 3, the unit directory stores a flag indicating the size of the unit directory, a CRC, a device maker ID and its index, the software version of the system controller of the printer and its index, and the address of the unit-specific information directory and its index.

As shown in FIG. 4, the unit-specific information directory stores a flag indicating the size of the unit-specific information directory, a CRC, a command address, and its index, used when a command is transmitted from the device controller 10 to the device 20, device maker name and its index, device model name and its index, and the address of the software information directory and its index.

As shown in FIG. 5, the driver-software information directory stores the data length of the data that has been stored in the driver-software information directory, a CRC, the corresponding OS (operating system) name of the driver software and its major version number and minor version number, and the storage address of the driver software. Since driver software of a plurality of types has been stored in the driver-software archive area, as will be set forth below, a corresponding OS name of the driver software, major version number, minor version number and driver software storage address also are stored in dependence upon the type of driver software.

A plurality of types of driver software are stored in the driver-software archive area illustrated in FIG. 6. Driver software of types "A", "B", "C" and "D" are stored in areas specified by addresses ad1, ad2, ad3 and ad4, respectively. Thus, in the communication system according to this embodiment, a plurality of types of driver software are stored in the driver-software archive area, and driver software suited to the operating system used in the device controller 10 connected to the device 20 is read out. The processing involved will be described in detail later.

Installation of driver software in the device controller 10 according to this embodiment will now be described.

Figure 7:
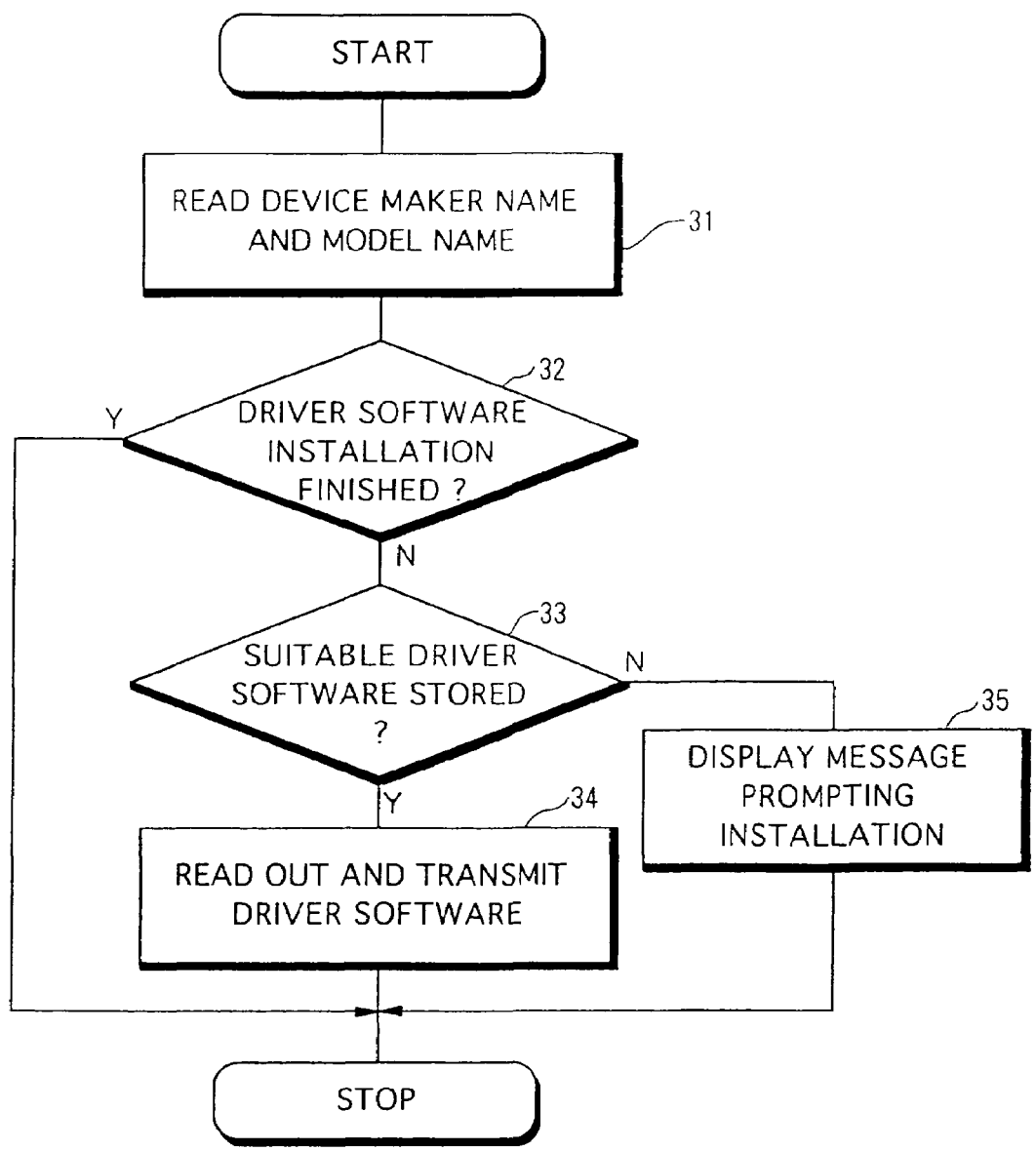
FIG. 7 is a flowchart illustrating the procedure of processing for installing a device driver.

FIG. 7 is a flowchart illustrating the processing procedure for installing driver software.

With reference to FIGS. 7 and 1, the maker name and model name of the device 20 connected to the device controller 10 are read (step 31). In order to read this information, a first reference is made to the root directory shown in FIG. 2, where the address of the unit directory is sensed. The unit directory is referred to based upon the address of the unit directory. The address of the unit-specific information directory is sensed from the unit directory. The unit-specific information directory is referred to based upon the address of the unit-specific information directory. The device maker name and device model name are sensed from the unit-specific information directory. The data representing sensed device maker name and device model name is read out of the EEPROM 24 and supplied from the device 20 to the device controller 10. The data representing the device maker name and device model name is stored temporarily in the main memory 15 of the device controller 10.

Next, it is judged whether driver software suitable for controlling the device 20 connected to the device controller 10 has been stored in the main memory 15 of device controller 10 (step 32). If the driver software has already been stored in the main memory 15 ("YES" at step 32), processing for installing the driver software is unnecessary. Processing is terminated as a result. If the driver software has not been installed in the main memory 15 ("NO" at step 32), it is judged whether driver software suitable for controlling the device 20 has been stored in the EEPROM 24 of the device 20 (step 33). This judgement is made by referring to the unit directory of FIG. 3 based upon the root directory of FIG. 2 and to the unit-specific information directory of FIG. 4 based upon the unit directory in a manner similar to that of the processing (step 31) for reading the device maker name and model name. The address of the driver-software information directory is sensed from the unit-specific information directory. The driver-software information directory shown in FIG. 5 is referred to based upon this address. It is judged whether a name the same as that of the operating system running on the device controller 10 and whether a version number the same as or later than the version number of this operating system have been stored in the driver-software information directory. When the same name has been stored as well as the same or later version number of the operating system, it is judged that driver software suited to the device controller 10 has been stored in the EEPROM 24 of the device 20 ("YES" at step 33).

If it is judged that driver software suited to the device controller 10 has been stored in the device 20, the storage address of the suitable driver software is sensed from the driver-software information directory. Data representing the driver software suited to the device controller 10 is read out of the driver-software archive area based upon the sensed address. The data representing the driver software that has been read out is transmitted from the device 20 to the device controller 10 in accordance with IEEE 1394 (step 34).

The data representing the driver software is received by the device controller 10 and stored in the main memory 15. This completes the installation of the driver software. Reading out the driver software that has been stored in the main memory 15 makes it possible for the operation (a printing operation, image data reading operation, etc.) of the device 20 to be controlled by the device controller 10.

If driver software suitable for control of the device 20 has not been stored in the EEPROM 24 of the device 10 ("NO" at step 33), then a message to this effect and a message calling for installation of the driver software are displayed on the display unit 14 of the device controller 10 (step 35). In response, the user loads a storage medium such as a floppy disk storing the driver software suitable for control of the device 20 into the floppy disk driver (not shown) of the device controller 10, thereby performing installation.

In the embodiment described above, data transfer of the driver software is carried out based upon IEEE 1394. However, it goes without saying that the data transfer may be performed based upon another standard.

If the device 20 in the above-described embodiment is a digital video camera, plural types of driver software would be stored in the digital video camera and the driver software suitable for controlling the camera would be read out of the camera and transmitted to the camera controller (device controller). If the device 20 is a printer, then plural types of driver software would be stored in the printer and the driver software suitable for controlling the printer would be read out of the printer and transmitted to the printer controller (device controller).

Further, in the embodiment described above, driver software suited to the device controller 10 is transmitted from the device 20 to the device controller 10. However, data representing the address of the location storing this driver software and data representing the operating system for operating this driver software may be transmitted to the device controller 10 in addition to the driver software. This will make it possible to more speedily read out the driver software again merely by referring to these items of data.

(2) Second Embodiment

Figure 8:
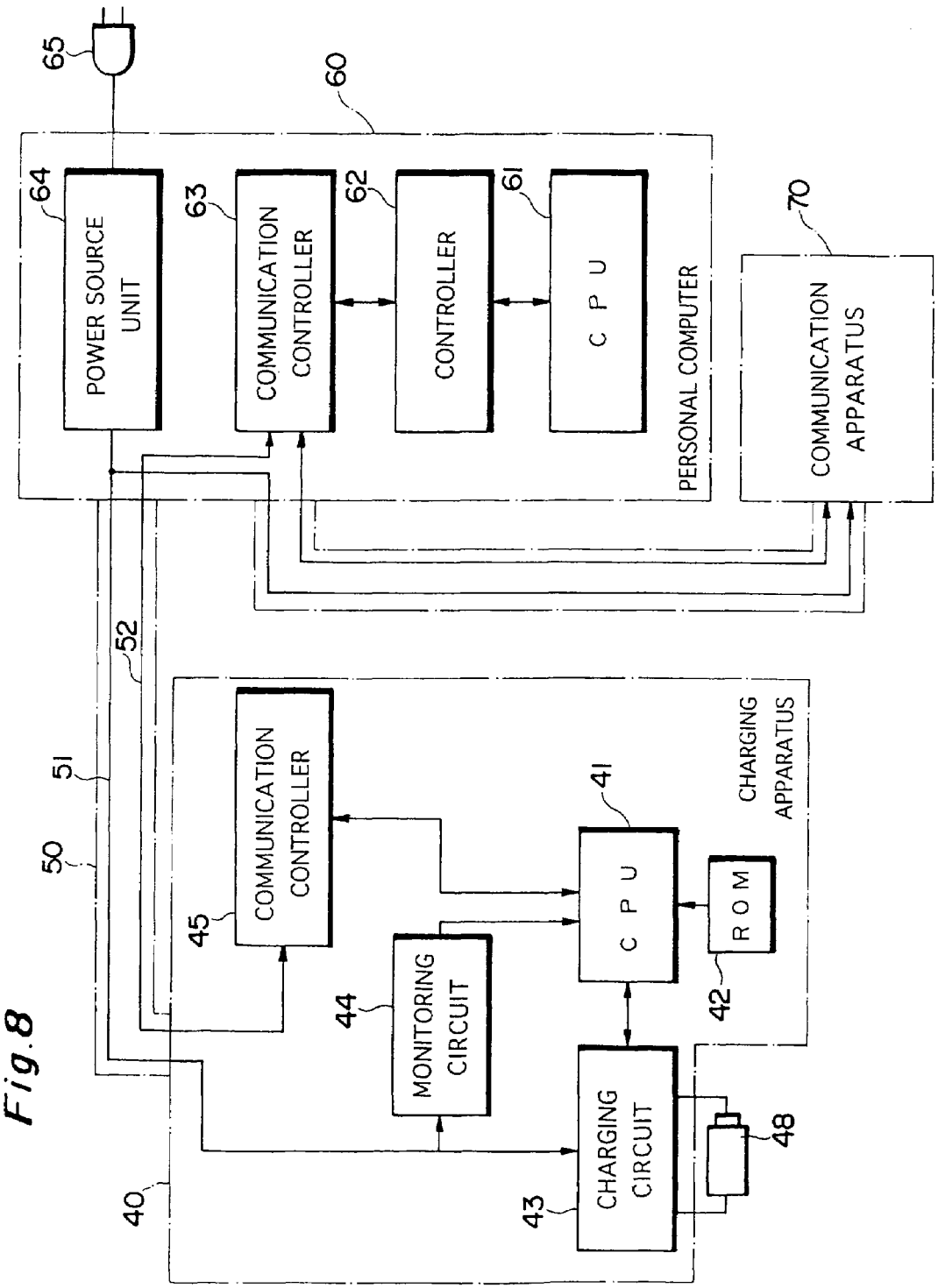
FIG. 8 is a block diagram illustrating a second embodiment of the present invention and showing a charging apparatus, a personal computer and a communication apparatus interconnected by a cable in accordance with IEEE 1394.

FIG. 8 illustrates a second embodiment of the present invention.

As shown in FIG. 8, a charging apparatus 40, a personal computer 60 and a communication apparatus 70 are interconnected by a cable 50 in accordance with IEEE 1394. The cable 50 includes a signal line 52 for transmitting data and a power supply line 51 for supplying electric power. The cable 50 includes a ground line as well, though this is not shown. Though there are four signal lines in actuality, here only one is shown in order to simplify the drawing.

The overall operation of the charging apparatus 40 is supervised by a CPU 41. A ROM 42 storing data to be sent to and received from the personal computer 60 is connected to the CPU 41. A communication control circuit 45, which is for sending and receiving data in accordance with IEEE 1394, is also connected to the CPU 41. The communication control circuit 45 is connected to the signal line 52.

The charging apparatus 40 includes a charging circuit 43 for charging a battery 48. The charging circuit 43 is connected to the power supply line 51 and charges the battery 48 by electric power supplied from the power supply line 51. The power supply line 51 is connected to a monitoring circuit 44 as well in order that the electric power supplied from the power supply line 51 may be monitored. Data representing the status of the electric power (i.e., where it is equal to or greater than a fixed level) supplied from the power supply line 51 is applied from the monitoring circuit 44 to the CPU 41. It should be noted that a cable for supplying electric power from an external power source is not connected to the charging apparatus 40.

The overall operation of the personal computer 60 is supervised by a CPU 61.

The personal computer 60 also includes a communication control circuit 63 capable of sending and receiving data in accordance with IEEE 1394 and connected to the cable 50. The communication control circuit 63 is controlled by a controller 62. The controller 62 is controlled by the CPU 61.

The personal computer 60 includes a power source unit 64. By plugging an AC plug 65 into the socket of a commercial power supply, 120-volt AC voltage is applied to the power source unit 64. The power source unit 64 converts the 120-volt AC voltage to a DC voltage of 8 to 40 volts. The power source unit 64 also is connected to the power supply line 51. The converted DC voltage of 8 to 40 volts is supplied to the power supply line 51, whereby the DC voltage is supplied as power for driving the charging apparatus 40 and communication apparatus 70 connected by the cable 50. It goes without saying that the DC voltage obtained by the conversion in the power source unit 64 is supplied as driving voltage to each of the components of the personal computer 60.

The operation through which charging is carried out by the charging apparatus 40 will now be described.

Figure 9:
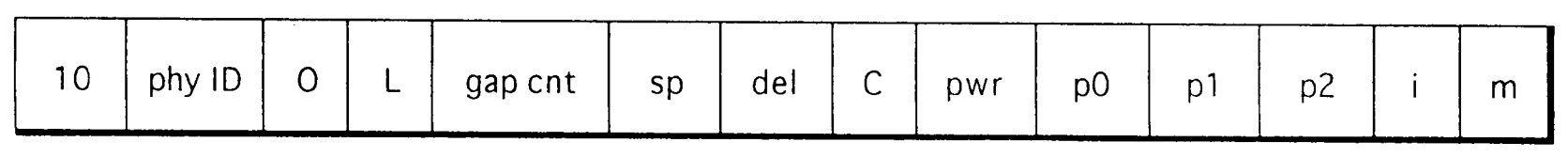

Whether the cable 50 in accordance with IEEE 1394 has been connected between the charging apparatus 40 and personal computer 60 or not is monitored by the communication control circuit 45 of the charging apparatus 40 and the communication control circuit 63 of the personal computer 60. If the cable 50 has been connected between the charging apparatus 40 and personal computer 60, a bus reset is performed and self-identification packets of the kind shown in FIG. 9 are transmitted mutually between the charging apparatus 10 and personal computer 60. (Self-identification packets naturally are transmitted between the communication apparatus 70 and personal computer 60 as well.)

First through fourth self-identification packets are transmitted in dependence upon the number of ports to which the cable 50 is connected. Here it is assumed for the sake of simplicity that one self-identification packet is transmitted.

As shown in FIG. 9, an area 10 of the packet stores the identifier of the self-identification packet, an area phy ID stores an identifier specific to the apparatus that transmits this self-identification packet, an area 0 stores data indicating that this is the first self-identification packet, an area L stores data indicating whether the communication control circuit of the apparatus that transmits the self-identification packet is in a state in which it can receive data, an area gap cnt stores data relating to a threshold value used in judging a sub-action gap and an arbitration gap, etc., in data transfer in accordance with IEEE 1394, an area sp stores data representing capability relating to data communication speed, an area del stores data relating to delay time which occurs in a case where an apparatus that has received data transfers the data to another apparatus, an area c stores data representing whether a bus manager and isochronous resource manager can be implemented in data transfer in accordance with IEEE 1394, an area pwr stores data indicating whether this apparatus has the ability to supply electric power, as well as data indicating maximum power consumption, areas p0 to p2 store data relating to whether another apparatus is connected to the port of this apparatus as a higher order apparatus or as a lower order apparatus hierarchically speaking, an area i stores the self-identification packet of the apparatus which began bus reset first, which packet includes data relating to this fact, and an area m stores data indicating whether a self-identification packet is to follow.

Self-identification packets of this kind are transmitted between the charging apparatus 40 and personal computer 60 at occurrence of bus reset. When the charging apparatus 40 receives the self-identification packet transmitted from the personal computer 60, the charging apparatus 40 senses the power supplying capability of the personal computer 60 stored in the area pwr of this self-identification packet. The sensed power supplying capability and the maximum power consumption of the charging apparatus 40 (the relevant data having been stored in the ROM 42) are compared. If the power supplying capability exceeds the maximum power consumption, the battery 48 is charged by the charging circuit 43. If the power supplying capability is less than the maximum power consumption, on the other hand, charging of the battery by the charging circuit 43 is inhibited.

In a case where the communication apparatus 70, which is a communication apparatus other than the charging apparatus 40 and the personal computer 60, are connected by the cable 50 in accordance with IEEE 1394, there are instances where data representing the power supplying capability of the communication apparatus 70 will be applied to the charging apparatus 40 regardless of the fact that the electric power is being supplied from the personal computer 60. In such case a situation may arise in which the electric power actually provided by the personal computer 60 falls below the maximum power consumption of the charging apparatus 40. In order to prevent this situation, the monitoring circuit 44 in the charging apparatus 40 shown in FIG. 8 monitors the level of the power supplied from the power supply line 51. If the CPU 41 judges on the basis of the signal output by the monitoring circuit 44 that a voltage drop will be caused by charging carried out by the charging circuit 43, the charging circuit 43 is controlled by the CPU 41 so as to perform charging to such a degree that will not cause a drop in voltage.

The personal computer 60 also compares the maximum power consumption and power supplying capability stored in the area pwr of the self-identification packet transmitted from the charging apparatus 40. If required, the personal computer 60 terminates the supply of electric power to the charging apparatus 40.

It goes without saying that data (e.g., data relating to the state of charging) is sent and received by the charging apparatus 40 and personal computer 60 in FIG. 8 through the signal line 52 included in the cable 50.

Figure 10:
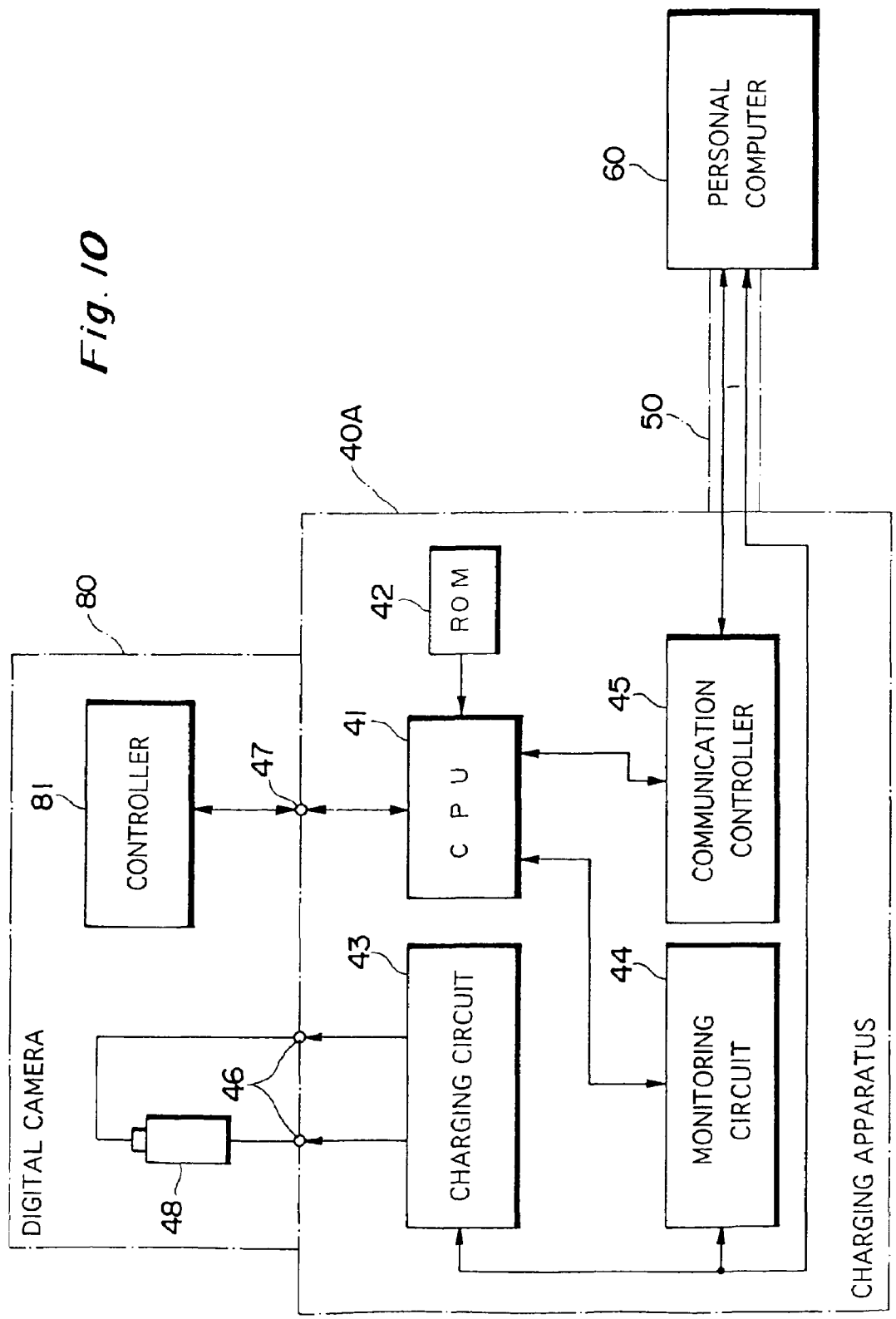
FIG. 10 is a block diagram illustrating another embodiment of the present invention and showing a charging apparatus, which is connected to a digital camera, and a personal computer connected to the charging apparatus.

FIG. 10 is a block diagram illustrating another embodiment of the present invention and showing a charging apparatus 40A, which has been connected to a digital camera (data processing unit) 80, and the personal computer 60 connected to the charging apparatus 40A by the cable 50 in accordance with IEEE 1394. Components identical with those shown in FIG. 8 are designated by like reference characters and are not described again.

The charging apparatus 40A shown in FIG. 10 is formed to have connectors 46 and 47 by which the charging apparatus 40A and the digital camera 80 are electrically connected to each other. Electric power supplied from the charging circuit 43 is applied to the connectors 46. The connector 47 is connected to the CPU 41.

The digital camera 80 includes a controller 81 and sends and receives data to and from the charging apparatus 40A via the connector 47. (Though the digital camera 80 includes a variety of circuits, they are not illustrated here as they have no direct bearing upon the present invention.) The battery 48 serving as the driving power supply is installed in the digital camera 80. The two ends of the battery 48 are connected to the connectors 46.

By thus connecting the charging apparatus 40A to the digital camera 80, the battery 48 installed in the digital camera 80 can be charged using the charging circuit 43 included in the charging apparatus 40A.

As many apparently widely different embodiments of the present invention can be made without departing from the spirit and scope thereof, it is to be understood that the invention is not limited to the specific embodiments thereof except as defined in the appended claims.

What is claimed is:

1. A charging apparatus for connecting to a communication apparatus, said communication apparatus performing data communication via a communication channel connected to a computer, said communication channel being used to make the connection between said charging apparatus and said communication apparatus, said communication channel including a communication line for data communication and a power supply line for supplying electric power, and said charging apparatus comprising:

a monitoring circuit for monitoring the electric power level supplied through said power supply line, where data representing the monitored power level is supplied to a processor in the charging apparatus which controls the power level in the power supply line based on the monitored power level and charging ability of said communication apparatus; and a charging circuit for applying electric power, with which it is supplied through said power supply line from said computer via said communication channel, to a connector of a data processing unit driven by a battery installed in said data processing unit, the data processing unit being formed to have said connector in order to input electric power for charging the battery, and said data processing unit being freely attachable and detachable to said connector of said charging apparatus.

2. A method of charging a battery using a charging apparatus connected to a communication apparatus, which is capable of performing data communication via a communication channel connected to a computer, and using said communication channel to make a connection wherein:

said communication channel includes a communication line for data communication and a power supply line for supplying electric power, said method comprising the steps of:

monitoring, by a monitoring circuit in said charging apparatus, the electric power level supplied through said power supply line, where data representing the monitored power level is supplied to a processor in the charging apparatus which controls the power level in the power supply line based on the monitored power level and charging ability of said communication apparatus;

applying electric power by said charging apparatus, supplied through said power supply line from said computer via said communication channel, to a connector of a data processing unit driven by a battery installed in said data processing unit, forming the data processing unit to have said connector in order to input electric power for charging the battery, and charging said battery by the electric power applied.

3. The method according to claim 2, wherein the communication channel is a cable in accordance with IEEE 1394.

4. The method according to claim 2, wherein the data processing unit is a digital camera.

5. The method according to claim 2, wherein the data processing unit is freely attachable and detachable to said connector of the charging apparatus.

6. The charging apparatus according to claim 1, wherein the communication channel is a cable in accordance with IEEE 1394.

7. The charging apparatus according to claim 1, wherein the data processing unit is a digital camera.

8. The charging apparatus of claim 1, wherein within the charging apparatus the power supply capability of said computer is compared with the power consumption by said charging apparatus, such that said battery will be charged by said charging circuit only if said power supply exceeds a determined maximum power consumption.

9. The charging apparatus according to claim 1, wherein the charging apparatus senses the power supplying capability of the computer and controls the charging of the battery based on the sensed power.

10. The method according to claim 2, further including sensing, by the charging apparatus, the power supplying capability of the computer, and controlling the charging of the battery based on the sensed power.

11. The charging apparatus of claim 1, further including:

a processor that controls apparatus of the charging apparatus;

a memory that stores data associated with the computer; and a communication controller that controls communication between the processor and computer.

* * * * *